United States Patent [19]

Schulze et al.

[11] Patent Number: 4,518,378

[45] Date of Patent: May 21, 1985

[54] APPARATUS FOR THE MANUFACTURE OF PLASTIC BAGS

[75] Inventors: Ehrhart Schulze, Fellbach; Franz Bochtler, Rudersberg, both of Fed. Rep. of Germany

[73] Assignee: Karl Heinz Stiegler, Fed. Rep. of Germany

[21] Appl. No.: 336,566

[22] Filed: Jan. 4, 1982

[30] Foreign Application Priority Data

Jan. 13, 1981 [DE] Fed. Rep. of Germany ....... 3100722

[51] Int. Cl.³ .......................... B31B 1/16; B31B 23/14
[52] U.S. Cl. .................................... 493/204; 493/194; 156/515
[58] Field of Search ............... 493/193, 194, 195, 196, 493/203, 204, 210, 224, 239; 156/515, 510

[56] References Cited

U.S. PATENT DOCUMENTS

| | | | |
|---|---|---|---|
| 3,587,410 | 6/1971 | Dechanciaux | 493/194 |
| 4,235,659 | 11/1980 | Achelpohl | 156/510 |
| 4,371,365 | 2/1983 | Shingo | 493/204 |
| 4,395,252 | 7/1983 | Lehmacher | 493/204 |
| 4,396,379 | 8/1983 | White et al. | 493/204 |

Primary Examiner—Rodney H. Bonck
Attorney, Agent, or Firm—Hoggood, Calimafde, Kalil, Blaustein & Judlowe

[57] ABSTRACT

The invention is embodied in bag-making apparatus wherein a tubular web of thermoplastic film is intermittently advanced, in bag-length increments. In the dwell between successive advances, there is a cycle of sealing, cut-off and stack accumulation, the accumulation being onto needles to form a stack.

The needles comprise a single group, forming part of a single transfer mechanism, operative (a) to transfer to a conveyor each successive needled stack, into partially lapped relation with the previously transferred stack, (b) to disengage its needles from the transferred stack, and (c) to return the needles to normal needling position, for anchored accumulation of bags as they are formed for the next stack. The transfer operation, including return of the needles to needling position, occurs within the dwell time required for one bag-seal and cut-off operation, so that normal full-speed operation of bag-sealing and cut-off mechanism can proceed without interruption, even though the single set of stack-accumulative needles is, at stack-completion intervals, transiently involved in stack-transfer to the conveyor.

6 Claims, 2 Drawing Figures

APPARATUS FOR THE MANUFACTURE OF PLASTIC BAGS

BACKGROUND OF THE INVENTION

The present invention relates to apparatus for the manufacture of plastic bags from a tubular web of film which is advanced intermittently in the forward direction. The apparatus has cyclically operating sealing and cutting devices for producing a bottom-weld seam of each bag (such seams extending transversely of the film web) and for separating the bags from the film web. The apparatus also has a stacking station arranged behind the cutting device as seen in the direction of advance, and the stacking station is equipped with a plurality of movable needles which can be moved by a suitable drive, between (a) a needling position which is adjacent the cutting device (in which needling position the open-end region of bags separated by the cutting device can be pushed onto the needles by a movable hold-down plate, in order to form a stack of bags which rests on a slotted resting surface), and (b) a transfer position which is further away from the cutting device in the direction of advance (in which transfer position the needles are withdrawn from the stack of bags, thereby transferring the latter to a conveyor device, for removal of successive stacks in the direction of advance).

One apparatus of this kind is already known from West German Unexamined Patent Application (Offenlegungsschrift) No. 2,833,236. In this known apparatus, the needles are arrayed in two straight needle rows which are parallel to each other, each of them extending transverse to the direction of bag advance, and over at least a large part of the width of the bags to be needled. In this known apparatus, the needles of one row of needles are in staggered relation to the needles of the other row of needles, so that needles of the two rows pass through each other in the manner of a comb, i.e., they can move independently of each other. The rows of needles are so moved, each by its own drive (which is associated with each row of needles and can be controlled independently from the action of the other drive), that during transfer motion of one row of needles from its needling position, the other row of needles (which had remained in engagement with the stack which was previously transferred to the conveyor device) is disengaged from the stack and moved into the needling position; transfer motion of the one row of needles is stopped as soon as the stack needled on it comes to lie on the conveyor device, but the needles of said one row remain temporarily engaged to the stack.

In the known apparatus, the presence of two independently movable rows of needles is deemed necessary for positive control of bag stacks, in that the stack of bags last fed to the conveyor device can be held secure by continuous engagement of the needle points of one row until needles of the other row have accumulated a stack and have begun to move out of needling position, or until at least one or more newly produced needled bags protectively cover the front edge of the last stack fed to the conveyor device. Such securing of the last stack fed to the conveyor device is intended to prevent the last stack from disarray, in the presence of a stream of film-tensing blast air from nozzles disposed upstream of the sealing and cutting devices. The advantage of positively securing of the stack last fed to the conveyor device is, however, obtained in the known apparatus at substantial cost disadvantage, caused by the presence of two rows of needles which must be moved independently of each other. Since separate drives are needed for the two rows of needles, there is structural complexity, resulting in correspondingly high manufacturing cost. Furthermore, there is the disadvantage of a high consumption of energy caused by the fact that in each case the masses of two drive systems must be accelerated and decelerated for intermittent displacement of the two rows of needles.

BRIEF STATEMENT OF THE INVENTION

The object of the present invention is to provide relatively simple apparatus of the indicated character, permitting the manufacture of bags and the combining thereof into stacks of bags in an economical and dependable manner.

In application to one apparatus of the indicated character, the invention achieves the above object by combining all needles into a single group, for example, a single row of needles, and by providing for completion of their drive movement within a single operating cycle of the sealing and cutting devices, this movement bringing the needles of the needle row out of needling position, into the transfer position, and then out of the latter and back into the needling position. The needle drive is so designed that all needles proceed along a closed two-dimensional displacement course during progress of a single operating stroke, the displacement course extending from the needling position, via the transfer position and back into the needling position; and all produced bags can, without interruption of the bag-making operation, be needled and transferred stackwise to the conveyor device, using a single group of needles.

Starting from the needling position, the course of movement of the needle group commences, once the desired number of sealed and cut-off bags has been pushed onto the needle points, the needles being stationary in the needling position. More accurately stated, movement of the single row of needles out of needling position commences just before or simultaneously with the next successive feeding advance of the film web, such feeding advance being the occasion for advancing the next bag length of web film into sealing position. Before transfer, the bag-mouth-end of the needled stack of bags is supported by the transfer mechanism, while substantially all the remaining bag area of the stack rests on stacks of bags previously transferred to the conveyor, the stacks on the conveyor being in staggered, lapped relation; and, the transfer operation slides the new stack into further-lapped relation with the previously transferred stack (on the conveyor), leaving an unlapped short offset of the bag-mouth end of the newly transferred stack when the needles are withdrawn upon completion of transfer.

During the initial phase of transfer motion of the needle group, i.e., while moving the needles out of the needling position, the conveyor device is preferably in operation so that the needled stack, as well as transferred stacks which have preceded the same, are removed from the region of the sealing and cutting device. At the same time, the newly-advanced bag length of film web serving for the formation of the next-succeeding bag moves over the needled bags of the currently building stack. Approximately simultaneously with attainment of the transfer position, when the needles are pulled out of the transferred stack (having served their function of maintaining stack control, to the point of transfer to the conveyor), the next-following bag-length of film web has reached the sealing position, so that the sealing and cutting process for the new bag can commence while the single group of needles returns from the transfer position and back into the needling position; the tips of the needles complete their return to the needling position before conclusion of the sealing and cutting process. After completion of the sealing and cutting process, the newly cut-off bag is pushed onto the tips of the needles, and it becomes the first bag of the following stack.

Since apparatus of the invention requires only a single drive for the single group of needles involved, there is substantial simplification and construction. The intermittent action of the single drive must be controlled in synchronism with the operating cycle of the sealing and cutting devices, but the involved control expense is substantially less than for the known prior device, wherein two individually controlled drives (for two rows of needles) are required and must be coordinated with each other and with sealing and cutting functions.

In apparatus of the invention, despite use of only a single group of needles, which group is withdrawn from each bag stack transferred to the conveyor device upon attainment of the transfer position, there is no danger that the stream of blast air will upset or derange the bag stack which has just been transferred. As mentioned above, displacement of the needles out of the needling position occurs approximately simultaneously with the forward advance of a new bag length of film web. During this web-feed phase, the just-completed stack is still engaged with the needles of the now-moving row, and these needles are withdrawn from the just-completed stack only when the transfer position has been reached, i.e., only upon transfer to the conveyor device. And by the time of such needle withdrawal, the advanced new bag length of film web, in the case of a correspondingly high speed of advance, has already reached the sealing position, when the working gap at the cutting and sealing devices has necessarily closed to commence a new sealing process; the stream of blast air is therefore practically completely blocked by closure of the working gap. While this working gap is closed, the group of needles moves from the transfer position back into the needling position, and the first sealed and separated bag of the next stack to be formed becomes needled before the working gap next opens at the sealing and cutting devices, i.e., before the stream of blast air can again discharge toward the region of the finished bags.

Should the advance of the film web occur in such manner that the web-advance step is not completely terminated at the time when the needles withdraw from the stack of bags transferred to the conveyor device, it is possible for the stream of blast air to flow through the open working gap when the most-recently transferred stack of bags is unsecured. But spoilage of this stack by the stream of blast air need not be feared if, as in a preferred embodiment, (a) a slotted resting surface is provided for support of successively needled bags in the needling position (the needles extending through the slots), (b) the slots are disposed in transversely staggered relation to the blast nozzles which produce the stream of blast air, and (c) the resting surface extends sufficiently in the web-feed direction and is disposed sufficiently above the conveyor (i.e., above the level of the stack just transferred to the conveyor) that the resting-surface portions between these slots form an air deflector which effectively shields the newly transferred stack from the stream of blast air.

A particularly reliable deflecting action is obtained if the resting surface extends downstream from the region of the working gap (of the sealing and cutting devices) and approximately to a region which is located above the open-end edges of the bags of the stack most-recently transferred to the conveyor device. In such a positional relationship, the recently transferred stack is effectively overlapped by the air-deflecting surface, so that the stack cannot be spoiled even if the needles have been withdrawn from the stack and the working gap is still temporarily open to pass the stream of blast air.

In another feature of the preferred embodiment, a crank mechanism is provided as the drive for the group of needles, to convert a single rotation of its crankshaft into a closed-loop displacement of the tips of needles of the needle group, along a self-contained link curve. Employment of crank mechanism (instead of pneumatic actuating cylinders, two of each of which are provided for the drive of each needle row in the prior-art device), results in compact construction of the apparatus and enables rapid movement of the needle group, with further advantage that only relatively small inertial forces are involved. The apparatus can therefore be designed for particularly high cyclic frequencies, i.e., for high production capacity. Further, it becomes relatively simple to synchronize transfer-drive action with the working cycle of the sealing and cutting devices. The arrangement can be such that the crank mechanism can be driven via a clutch-brake combination which can be actuated for a single revolution of its driven shaft. Control of the clutch-brake combination may include a work-cycle counter. As soon as the content of the counter corresponds to the preselected number of cycles, i.e., the number of bags to be combined into a stack, the counter produces a control signal to actuate the clutch-brake combination, thus causing the crankshaft of the crank mechanism to make one revolution. In the course of this single revolution, the needles of the needle group undergo one full closed-loop displacement over the link curve.

In the particularly preferred illustrative embodiment, the drive side of the clutch-brake combination is in continuously driven relation with a transmission member of the main drive of the apparatus, and the main drive undergoes one revolution per operating cycle of the sealing and cutting devices. This relationship enables assured synchronization between operating cycle of the sealing and cutting devices and the movement of the needle group, without further expense.

In accordance with another feature of the preferred embodiment, the conveyor which receives bag stacks transferred by the needle group is intermittently driven, and its intermittent drive is derived from the crank mechanism which displaces the needle group over the course of its link-curve cycle. Thus, intermittent conveyor action is obtained without further expense, and there is no problem of synchronizing conveyor displacement with either the cycle of needle-group displacement or the cycle of the sealing and cutting devices.

DETAILED DESCRIPTION OF THE INVENTION

Figure 1:
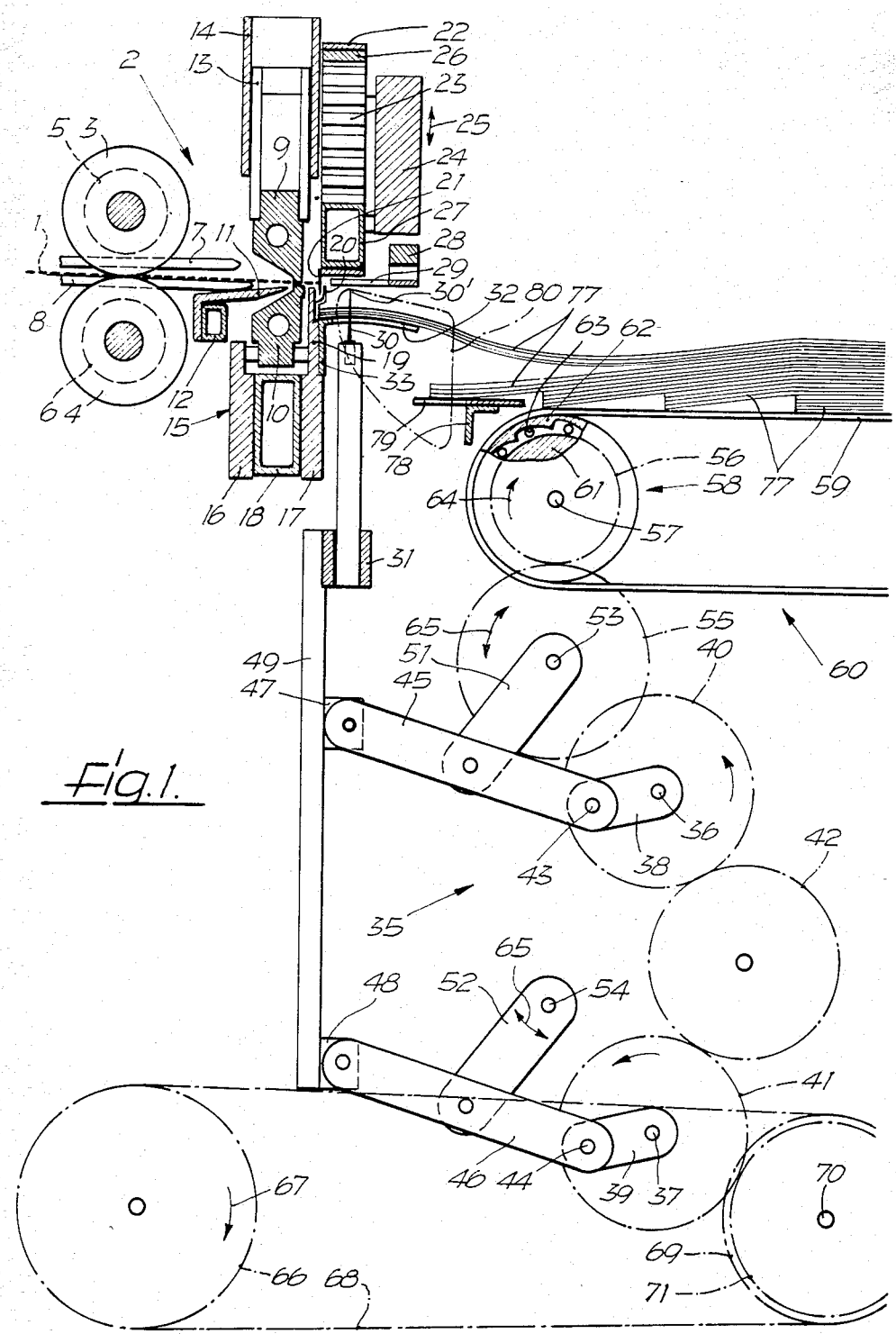
Figure 2:
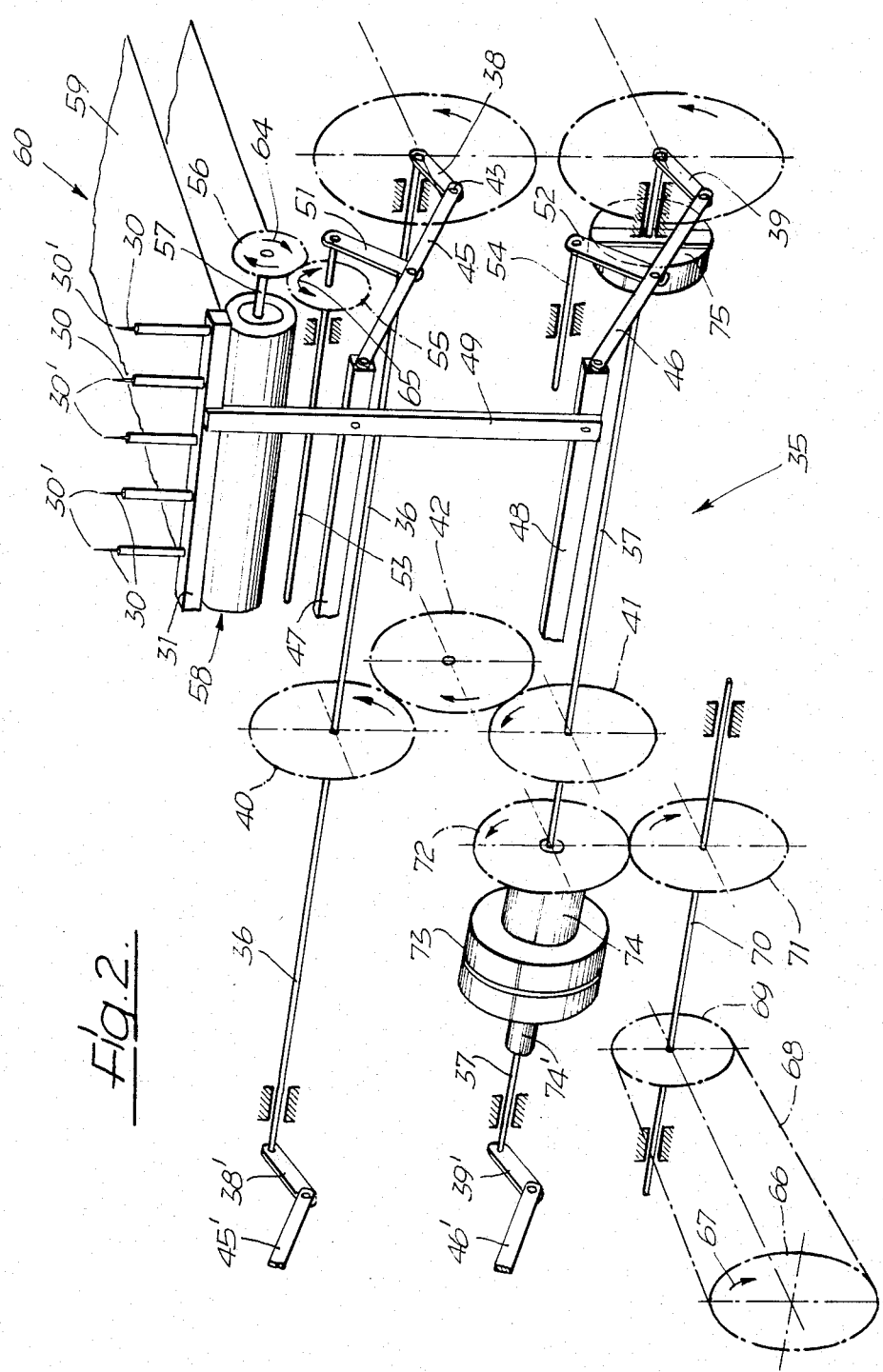

The invention will be illustratively described in detail, in conjunction with the accompanying drawings, in which:

FIG. 1 is a longitudinal sectional view, partially broken away and very schematic and simplified, to show an embodiment of the invention in the region of sealing and cutting functions in bag-making apparatus of the character indicated; and FIG. 2 is a fragmentary prespective view, also very schematic and simplified, to show essential transmission parts of the drive for a row of needles and for a conveyor device of the apparatus of FIG. 1.

The apparatus shown in the drawings is intended to cut bags from a web 1 of tubular film (FIG. 1) which is being transported in its longitudinal direction, the bottom seams of the bags being formed by heat sealing at the time of the cut-off operation. For reasons of clarity in the drawing, the machine frame and a number of parts of the apparatus have not been shown. Rather, only the presently most important parts are shown, namely those which form part of a sealing and cutting device (generally designated 2 in FIG. 1), and those which are adjacent to and/or functionally cooperate with the sealing and cutting device.

At short longitudinal offset from the sealing and cutting device 2, two coacting feed rolls 3-4 are disposed on opposite sides of the path of movement of the film web 1, for web grip and transport to device 2. It will be understood that feed rolls 3 and 4 may be driven intermittently by the main drive of the apparatus (not shown) in order, in coordination with the operating cycle of the sealing and cutting device 2, to sequentially advance a predetermined length of film web 1, corresponding to the bag length to be manufactured. The feed rolls 3 and 4 are provided with circumferential grooves, the bottom profiles of which are indicated by dashed lines 5 and 6, respectively; and comb-like rows of blast-air tubes 7, 8 are positioned to pass through these grooves. The web of tubular film 1 is so guided between the blast air pipes 7, 8 that the front end of film web 1 advanced by feed rolls 3, 4 is longitudinally stretched by the stream of blast air as it is advanced to the working gap of the sealing and cutting device 2. As will later appear, the blast-air tubes 7, 8 are movable.

In the showing of FIG. 1, the working gap is closed, but upon forward displacement of the film web 1, the working gap is opened, i.e., an upper movable welding element 9 is elevated to a raised position, so that its welding edge is at predetermined offset from the welding edge of a fixed lower welding element 10. A deflection-angle ledge 11 is movable with the blast-air tubes 7, 8 and is disposed below the web of film 1; the free edge of ledge 11 extends up into the vicinity of the welding edge of the lower welding element 10. As will also later appear, the deflection-angle ledge 11 is cooled by means of a square pipe 12 serving as a cooling-water conduit.

The movable welding element 9 is fastened to retaining ribs 13 which are vertically movable in a welding-element guide 14. Transmission mechanism from the main drive, for imparting vertical motion to the movable welding element 9, as part of the work cycle of the apparatus, has not been shown.

The fixed lower welding element 10 is securely mounted to a rigid welding-element holder 15. In the embodiment shown, the latter consists of two walls 16 and 17, with a rectangular cooling pipe 18 therebetween, for accommodation of a flow of cooling water. An upward extension 19 of wall 17 carries a rib 20, of Z-shaped sectional profile; rib 20 forms with the upper end of the extension 19 a guide groove for a cut-off knife 21, along which groove said knife is movable from one to the other side edge of the web of film, to cut individual bags from the web. Knife 21 is fastened to a toothed belt 22, and the latter is so conducted over two toothed-belt wheels 23 (only one of which is shown in FIG. 1) that its upper and lower courses extend horizontally across the entire width of the film web 1. The toothed-belt wheels 23 are rotatably mounted on a support member 24 which, as indicated by a double-ended arrow 25, is vertically movable so that the toothed belt 22 and knife 21 can be moved upward from the operating position shown in FIG. 1, in order to open the working gap. The upper course of toothed belt 22 is guided over a supporting ledge 26 having rigid connection to the support member 24, and the lower course of toothed belt 22 extends along the bottom side of a square pipe 27, which accommodates a flow of cooling water. Again, drive mechanism for rotating the toothed-belt wheels 23, to produce operating displacement of the knife 21 and to impart vertical movement to support member 24, has not been shown in the drawing.

A movable hold-down 28 is disposed below support member 24 and includes a horizontally extending plate 29 which is edge-profiled in the manner of a rake, below the lower course of toothed belt 22. The hold-down 28 is also vertically movable and, again, transmission mechanism for the production of the involved movement has not been shown in the drawing. In the position shown in FIG. 1, plate 29 is above the points 30' of upstanding needles 30 (FIG. 2) which are mounted to the tines of a comb-like needle-support bar 31, the needles 30 forming a linear row which extends transverse to the direction of web advance and substantially over the entire width of the film web 1. In FIG. 1, the needle-support bar 31, which is movably supported in a manner described below, is in its needling position in which the needles 30 pass through longitudinal slots, open at one end, within the upper flange of an angle member 33, said flange forming a resting surface 32 for the needled region of a bag. Angle member 33 is fastened to the extension 19 of wall 17 of the fixed welding-element support 15 and extends substantially over the entire transverse length of the row of needles. The longitudinal slots in the resting surface 32 and the blast nozzles (not shown) of the blast-air tubes 7, 8 are in laterally offset relation to each other.

A parallel double-crank mechanism, generally designated 35, is provided for movement of the needle-support bar 31. This mechanism has two crankshafts 36 and 37 extending in vertically spaced parallel relation and mounted for rotation in the machine frame, with their rotary axes parallel to the axes of feed rolls 3, 4. The axial extent of crankshafts 36 and 37 exceeds the width of the widest web of film 1 to be worked by the apparatus, so that the crankshafts 36, 37 project laterally of the transport path. A crank is carried at each end of each crankshaft 36, 37, and all such cranks are arranged parallel to each other and are of identical development. The two cranks of crankshaft 36 are designated 38 and 38', and the cranks of crankshaft 37 are designated 39 and 39'. Since other drive members which cooperate with these cranks are developed identically at both ends of crankshafts 36, 37, the parts cooperating with cranks 38' and 39' have not been completely shown in FIG. 2, and the description can be limited to those parts of FIG. 2 which can also be noted in FIG. 1.

The central region of each crankshaft 36 (37) carries a spur gear 40 (41); gears 40, 41 are of the same size and mesh with an intermediate gear 42, so that the rotation of the two crankshafts 36 and 37 proceeds synchronously, and the cranks 38 and 39 are parallel to each other in all positions of rotation. Corresponding ends of identical further crank arms 45 (46) have pivotal connection to crank pins 43 (44) of the equally long cranks 38 (39), and each of these crank arms 45 (46) is pivoted at its other end to a transverse bar 47 (48), extending parallel to the needle-support bar 31. The transverse bars 47 and 48 and the needle-support bar 31 are connected via a plurality of connecting members 49 extending parallel to and spaced from each other, only one such member 49 being shown in the drawing. The transverse bars 47 and 48 as well as the needle-support bar 31, together with the connecting members 49 form the link of the crank mechanism 35. The parallel-crank mechanism is supplemented by rocker arms 51 (52), one end of each of which has pivotal connection to the central region of one of the crank rods 45 (46), while their other ends are connected to impart rotary reciprocation to rocker shafts 53 (54), rotatably mounted to the machine frame in vertically spaced relation and with their axes extending parallel to the axes of crankshafts 36 (37). The presence of rocker arms 51 (52) assures that crank rods 45 and 46 will remain parallel to each other in the course of rotation of the crankshafts 36 (37) and that the connecting members 49 will retain their vertical orientation.

In the course of rotation of the crankshafts 36 (37), the rocker shafts 53 and 54 undergo rotary reciprocation, i.e., displacement in both directions of rotation (as suggested by a double-headed arrow 65, FIG. 1). As best shown in FIG. 2, a spur gear 55 fastened to the rocker shaft 53 meshes with a spur gear 56, and spur gear 56 is fastened to a shaft 57 which drives a belt drum 58, forming part of a conveyor device, generally designated 60; one end of a conveyor belt 59 is shown tensed over the circumference of drum 58.

In FIG. 1, drum 58 is seen to include a cylindrical inner body 61, mounted for rotary reciprocation with shaft 57, and a drum shell 62 surrounds said inner body and is so shaped on its inner surface that, in coaction with anti-friction elements 63 (FIG. 1), a one-way-engaging clutch relationship is established; more specifically, for one direction of shaft 57 rotation the clutch elements 63 disengage to establish an escape or free-wheel relation between inner body 61 and drum shell 62, and for the other direction of shaft 57 rotation a clutched driving relation is established. Thus, shell 62 can be driven by shaft 57 only in the direction of rotation indicated by the arrow 64, which shaft 57 undergoes rotary reciprocation which it receives from meshed engagement of spur gears 55 and 56, corresponding to the rotary reciprocative movement of rocker shaft 53, indicated by the double-headed arrow 65.

Drive for the crankshafts 36 (37) is derived from the main drive of the apparatus, of which only a sprocket wheel 66 is shown in the drawings. Sprocket wheel 66 undergoes one revolution in the direction of rotation indicated by an arrow 67, for each operating cycle of the sealing and cutting device 2. This rotary movement is transmitted by a roller chain 68 to a sprocket wheel 69, mounted to drive an intermediate shaft 70. The number of teeth of sprocket wheel 69 is less than the number of teeth of sprocket wheel 66, so that shaft 70 rotates at a speed greater than the speed of rotation of sprocket wheel 66. A spur gear 71 mounted on shaft 70 is in 1:1 engagement with a spur gear 72 which is free to rotate on crankshaft 37, and gear 72 is connected to rotate the drive-side hub 74 of a single-revolution clutch 73; the driven-side hub 74' of clutch 73 is connected to drive the crankshaft 37.

A brake 75 (FIG. 2) is disposed on crankshaft 37 and can be controlled electromagnetically; like the single-revolution clutch 73, brake 75 can be actuated by control means (not shown), for instance a control switch, and the action of brake 75 determines alternate stopping and starting of rotation of crankshaft 37.

The manner of operation of the apparatus will now be explained.

FIG. 1 shows the apparatus in an operating condition in which the needles 30 are in their needling position. Plural previously formed bag stacks 77 lie in mutually staggered relation on the conveyor belt 59 of conveyor device 60, and a stack-support member 78 still supports the open-end region of the bags of the stack 77 which was most recently transferred to the conveyor device 60. The stack-support member 78 includes a resting plate which is characterized by rake-like longitudinal slots in the edge region 79 thereof which faces the sealing and cutting device 2; these rake-like slots are transversely spaced to correspond with the longitudinal slots which characterize the resting surface 32 of angle member 33. During the needling process, needles 30 will be understood to have pierced the open-end region of the bags of the new stack 77 which has not yet been transferred to the conveyor device 60.

FIG. 1 shows that the new stack 77, which has not yet been transferred to the conveyor device 60, is still incomplete. The bag which has last been sealed and separated from the film web 1 has been engaged to needles 30 by a downwardly directed push-on displacement of the hold-down 28 and its plate 29, the needles extending upward in the needling position through the rake-like cutouts (open-ended longitudinal slots) in the resting surface 32. It will be understood that, having needled the most recently formed bag, the hold-down 28 has already moved upward to such an extent that its plate 29 (through the rake-like cutouts of which needles 30 engaged the bag by reason of plate 29 pushing the bag onto the needles) is again positioned above the needle points 30'.

The apparatus is now ready for the next operating step, which commences with an opening of the working gap, at the sealing and cutting device 2. Concurrently, the movable sealing element 9 as well as the hold-down 28 and its plate 29 move upward. Additionally, the knife 21 which serves as the cutting device on the toothed belt is raised due to the fact that the support 24 of the cutting device is moved upwards. And the movable deflection-angle ledge 11 is lifted, in unison with blast tubes 7 and 8, by known means not shown in the drawing; such lifting raises the web of film from welding element 10 at the forward-end region of the web, i.e., at the bottom seam which has just been sealed. At the same time, feed rolls 3 and 4 are placed in operation to advance the web of film to the extent of a predetermined feed distance which corresponds to desired bag length; throughout the course of its roll-fed advance, the web is stretched tight by the stream of air collectively emerging from the nozzles of the blast-air tubes 7, 8, said stream supporting and drawing the forward end of the web through the opened gap of the sealing and cutting device 2. After effecting this web-advancing step, rotation of the feed rolls 3, 4 is terminated and the next sealing and cutting process commences, as the movable welding element 9 is moved downward to close the working gap. At the same time, support 24 is moved downward and the toothed belt 22 is driven, causing knife 21 to make a cutting traverse of the web, in the course of knife passage along the transverse extent of the space between Z-shaped rib 20 and the adjacent wall extension 19. The knife cut completes a new bag on the downstream side of device 2, and the open-end region of the new bag would rest on the points 30' of needles 30, were it not for a synchronized downward bag-pushing stroke of hold-down 28 and its bag-engaging plate 29, driving the open-end region of the new bag into pierced engagement with needles 30, whereupon hold-down 28 (and its plate 29) is again raised to the needle-clearing position shown in FIG. 1.

A single operating cycle of the sealing and cutting device 2 is thus completed. During this cycle, the sprocket wheel 66 has undergone one complete revolution, and the sprocket wheel 69 has undergone more than one revolution, due to the smaller circumference of sprocket wheel 69, occasioning a step-up ratio whereby sprocket wheel 69 rotates at proportionally greater speed than rotation of sprocket wheel 66. The greater rotational speed of sprocket wheel 69 imparts correspondingly high-speed rotation to the drive-side hub 74 of clutch 73, via shaft 70 and the meshed spur gears 71 and 72. In intervals when the clutch 73 (whose driven-side hub 74' is coupled to the crankshaft 37) is not engaged, there is no rotation of crankshaft 37, the clutch 73 being engaged only when a predetermined sufficient number of bags has been needled onto the needles 30 to complete a needled bag stack 77, in readiness for transfer to the conveyor device 60. To determine the interval of clutch 73 disengagement, a counter (not shown) is provided to count the number of cycles of the sealing and cutting device 2, and such count will be understood to deliver a control signal to clutch 73 as soon as the preselected total number has been reached. The control signal is operative to engage clutch 73 and to release brake 75. Starting from the operating position shown in FIG. 1, as soon as the working gap at the sealing and cutting device 2 starts to open (by reason of lifting the welding element 9, the support 24 and the hold-down 28), a new operating cycle commences. The new cycle begins with resumed rotation of feed-roll drive, at 3 and 4, and with clutch 73 engagement to permit rotation of sprocket wheel 66 (and thus of the drive-side hub 74 of clutch 73) to impart rotation to crankshaft 37. With rotation of crankshaft 37, sprocket wheel 66 makes one revolution for each operating stroke of the sealing and cutting device 2 (i.e., one rotation synchronous to the operating stroke of the sealing and cutting device 2); desired synchronization is thus necessarily achieved for the operating cycle of the crank mechanism 35 and of the conveyor device 60, relative to the operating stroke of device 2. Once clutch 73 is actuated and brake 75 released, a given single rotation of sprocket wheel 66 (in the direction of arrow 67) initiates displacement of the row of needles 30, under the combined action of crankshafts 37 and their connection to the needle-support bar 31; in the course of a single cycle of such needle displacement, link curve 80 is the locus of displacement of needle points 30', link curve 80 being shown as a single closed-loop dot-dash line in FIG. 1.

The link curve 80 is seen to be characterized by a first substantially linear transport section which is inclined somewhat downward in the direction of work advance. This is followed by a substantially linearly downwardly extending second section, of needle withdrawal, and by a curvilinear third section, of needle return to the needling position.

Movement of needles 30 from the needling position starts immediately with the start of the operating cycle of the sealing and cutting device 2, namely, with the start of the complete opening of the working gap. Shortly after the working gap begins to open and therefore after a lifting of welding element 9 (together with support 24 and the hold-down 28), rolls 3 and 4 begin to feed a new bag length of the film web 1, in the advance direction. The fed-out length of film web 1 forms the first bag, which is needled to begin accumulation of a new stack of bags after the previously formed stack of bags 77 has been transferred to the conveyor device 60, by displacement action of needles 30 along the link curve 80. Since the slots in the resting surface 32 at the top of angle member 33 are staggered laterally with respect to the blast nozzles of the blast-air tubes 7, 8, the intervening regions of resting surface 32 (i.e., the regions between slots) form an air deflector which restricts the stream of blast air to a region above the stack 77 just transferred to the conveyor device 60, so that blast air flows above the conveyor device 60 without any disturbance of stacked bags. In the present example, the resting surface 32 extends, in the direction of advance, to a location above the upstream-edge region 79 of the stack support 78 of the conveyor device 60, i.e., the conveyor device 60 is, so to speak, overlapped by the air deflector so that the conveyor device 60 is effectively shielded from the stream of blast air.

In the course of needle 30 displacement along the two linear sections of link curve 80, the rocker shafts 53 and 54 undergo a swing movement which, as viewed in FIG. 1, is counterclockwise. As a result, spur gear 56 rotates in the direction of arrow 64, and via the spur gear 55 couples gear 56 to the rocker shaft 53. This rotation is transmitted by the free-wheeling or one-way engaging clutch (inner body 61, shell 62 and anti-friction elements 63) to drum 58, so that the conveyor belt 59 of the conveyor device 60 carries out a corresponding increment of transport movement in the forward direction. This transport movement is completed when needles 30, at the end of the linearly downward section of the link curve 80, have emerged from the stack 77 and have completed transfer of the stack to the conveyor device 60. Ensuing oppositely directed swing movement of rocker shafts 53 and 54, i.e., rotation of the spur gear 56 in the direction opposite the arrow 64, is without effect (due to freewheel escapement) and the conveyor belt 59 retains its position. The needles 30 now move from the transfer position along the curved third section of the link curve 80 and back into the needling position. By reason of the step-up ratio between the sprocket wheels 66 and 69, this position is reached, i.e., the crankshafts and cranks of the double-crank mechanism 35 have carried out their complete cycle, before sprocket wheel 66 completes a full revolution. Just before sprocket wheel 66 completes this full revolution, crankshafts 36, 37 will have completed their full revolution, clutch 73 (being a clutch for single-revolution operation), will have disengaged, and brake 75 will have been actuated. The needles 30 are now again in the needling position shown in FIG. 1, although the operating cycle of the sealing and cutting device 2 has not yet been concluded. This cycle is brought to an end by termination of the sealing process, by cutting off the fed-out length of film web 1 (the cut-off end initially contacting points 30' of the needles 30), and by thereupon needling the thus-formed first bag of the next stack 77 (the needling resulting from descent of the plate 29 of hold-down 28).

In the preferred embodiment, drive to the crank mechanism 35 derives from a sprocket wheel 66 which rotates discontinuously in accordance with the operating cycle, in which event the necessary synchronization of the described displacement of the needle group is directly obtained. And since drive of the conveyor device 60 is also derived from crank mechanism 35, the action of the conveyor device 60 also proceeds with desired coordination, without requiring additional expense for its control.

What is claimed is:

1. An apparatus for the manufacture of plastic bags from a web of tubular film and for stacking the resultant bags, which apparatus includes in combination means including an array of air jets for advancing cyclically a predetermined length of said web, sealing bars mounted on opposite sides of the path of said length of said web for cooperative movement into and out of seal producing engagement with said web length transverse thereto for producing bottom seams of the bags, means for severing a completed bag from said web adjacent the seam for a succeeding bag, a stacking station in the advancing direction of said web beyond said severing means, an intermittently operable transporter for transporting stacks of bags away from said stacking station, and means for transferring a stack of said bags from said stacking station to said transporter, characterized in that said stack transferring means comprises a single array of needles mounted for movement between said stacking station and a transfer station adjacent said transporter for moving the impaled end of a stack of said bags toward said transporter simultaneously and in coordination with transporter operation, means for advancing said transporter in synchronism with said needle stacking-station-to-transfer-station movement for moving the opposite end of said stack simultaneously with said needle movement, means for interrupting said transporter advancing movement when said needles reach said transfer station, a drive mechanism operatively coupled to said array of needles, said drive mechanism including a first crank and means linking said first crank to said needles for converting a single revolution of said first crank into a closed loop movement of the tips of said needles from said stacking station to said transfer station along a path above both of said stations and then below both of said stations to return to said stacking station, and a second crank mounted for rotation in parallel synchronism with and in the same plane as said first mentioned crank, each crank having pivotally joined thereto a connecting link joined at its other end to a common support for said needles, and a separate rocker arm joining an intermediate point of each of said connecting links, respectively, to a corresponding fixed pivot point, said connecting links operating in parallel and said rocker arms acting in parallel, said drive mechanism being coordinated with the operation of said web advancing means and said sealing bars for extracting said needles from said stack after said length of web has been advanced and said sealing bars have assumed their seam producing position and created a barrier to air from said air jets reaching said transporter supported stack, said needles reaching said stacking station prior to completion of said seam production, and means for impaling on said needles at said stacking station the end of each bag adjacent the line of severance from said web in coordination with such severance.

2. An apparatus according to claim 1, characterized in that said first crank is driven by a first crank shaft from a central drive train through a clutch-brake assembly, said central drive train being driven in common from the driving mechanism for the bag producing web feeding, sealing and cutting apparatus.

3. An apparatus according to claim 2, characterized in that a speed increasing drive train interconnects said central drive train with said first crank shaft for causing said crank shaft to complete one revolution in less time than it takes for the bag making apparatus to complete a single cycle of feeding a length of web and producing a completed bag.

4. An apparatus according to claim 3, characterized in that said means for advancing said transporter comprises a power take-off including a one-way clutch for communicating uni-directional intermittent motion to said transporter from a shaft connected to one of said rocker arms at its fixed pivot point.

5. An apparatus for the manufacture of plastic bags from a web of tubular film and for stacking the resultant bags, which apparatus includes in combination means including an array of air jets for advancing cyclically a predetermined length of said web, sealing bars mounted on opposite sides of the path of said length of said web for cooperative movement into and out of seal producing engagement with said web length transverse thereto for producing bottom seams of the bags, means for severing a completed bag from said web adjacent the seam for a succeeding bag, a stacking station in the advancing direction of said web beyond said severing means, an intermittently operable transporter for transporting stacks of bags away from said stacking station, and means for transferring a stack of said bags from said stacking station to said transporter, characterized in that said stack transferring means comprises a single array of needles mounted for movement between said stacking station and a transfer station adjacent said transporter for moving the impaled end of a stack of said bags toward said transporter simultaneously and in coordination with transporter operation, means for advancing said transporter in synchronism with said needle stacking-station-to-transfer-station movement for moving the opposite end of said stack simultaneously with said needle movement, means for interrupting said transporter advancing movement when said needles reach said transfer station, a drive mechanism operatively coupled to said array of needles, said drive mechanism including a first crank and means linking said first crank to said needles for converting a single revolution of said first crank into a closed loop movement of the tips of said needles from said stacking station to said transfer station along a path above both of said stations and then below both of said stations to return to said stacking station, said first crank being driven by a first crank shaft from a central drive train through a clutch-brake assembly, said central drive train being driven in common from the driving mechanism for the bag producing web feeding, sealing and cutting apparatus, whereby said drive mechanism is coordinated with the operation of said web advancing means and said sealing bars for extracting said needles from said stack after said length of web has been advanced and said sealing bars have assumed their seam producing position and created a barrier to air from said air jets reaching said transporter supported stack, said needles reaching said stacking station prior to completion of said seam production, and means for impaling on said needles at said stacking station the end of each bag adjacent the line of severance from said web in coordination with such severance.

6. An apparatus according to claim 5, characterized in that a speed increasing drive train interconnects said central drive train with said first crank shaft for causing said crank shaft to complete one revolution in less time than it takes for the bag making apparatus to complete a single cycle of feeding a length of web and producing a completed bag.

* * * * *